(12) United States Patent
Muendel et al.

(10) Patent No.: US 11,209,595 B2
(45) Date of Patent: Dec. 28, 2021

(54) RETROREFLECTIVE FIBER ENDCAP

(71) Applicant: Lumentum Operations LLC, San Jose, CA (US)

(72) Inventors: Martin H. Muendel, Oakland, CA (US); Richard D. Faulhaber, San Carlos, CA (US); Michael Lovelady, Mountain View, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/839,911

(22) Filed: Apr. 3, 2020

(65) Prior Publication Data

US 2021/0231872 A1 Jul. 29, 2021

Related U.S. Application Data

(60) Provisional application No. 62/966,420, filed on Jan. 27, 2020.

(51) Int. Cl.
*G02B 6/26* (2006.01)

(52) U.S. Cl.
CPC .................... *G02B 6/262* (2013.01)

(58) Field of Classification Search
CPC ........................................... G02B 6/262
See application file for complete search history.

(56) References Cited

U.S. PATENT DOCUMENTS

| 6,748,137 | B2 * | 6/2004 | Wolak | H01S 5/0683 |
| | | | | 385/33 |
| 6,792,008 | B2 * | 9/2004 | Wolak | H01S 5/0683 |
| | | | | 372/6 |
| 8,724,945 | B2 * | 5/2014 | Gapontsev | G02B 6/4296 |
| | | | | 385/38 |
| 9,572,479 | B2 * | 2/2017 | Smith | A61F 9/00823 |
| 10,082,630 | B1 * | 9/2018 | Hsia | G02B 6/262 |
| 10,141,707 | B2 * | 11/2018 | Karlsen | B23K 26/00 |
| 10,530,976 | B2 * | 1/2020 | Takeuchi | H04N 5/2256 |

* cited by examiner

*Primary Examiner* — Sung H Pak
(74) *Attorney, Agent, or Firm* — Harrity & Harrity, LLP

(57) ABSTRACT

An optical fiber endcap device may include an input facet spliced onto an input fiber and an output end through which counterpropagating light enters the optical fiber endcap device. The optical fiber endcap device further includes a plurality of angled facets that are arranged at respective angles relative to an axis of the optical fiber endcap device to reflect at least a portion of the counterpropagating light back through the output end of the optical fiber endcap device.

20 Claims, 4 Drawing Sheets

RETROREFLECTIVE FIBER ENDCAP

RELATED APPLICATION

This application claims the benefit of U.S. Provisional Patent Application No. 62/966,420, entitled "RETROREFLECTIVE FIBER ENDCAP," filed Jan. 27, 2020, the content of which is incorporated by reference herein in its entirety.

TECHNICAL FIELD

The present disclosure generally relates to an optical fiber endcap device, and more particularly, to a fiber optic endcap device having multiple planar or near-planar facets arranged to reflect at least a portion of incoming backwards-traveling or counterpropagating light.

BACKGROUND

Back reflection, sometimes referred to as optical return loss (ORL) and/or the like, is a generally undesirable characteristic that occurs when light changes direction within an optical fiber (e.g., at a connector interface) and returns toward a source of the light. For example, back reflection may be a significant concern in a high-power fiber laser application, such as cutting, welding, material depositing, and/or the like, because high power back reflection can cause significant damage to upstream components of the high-power fiber laser. In other examples, high-gain optical amplifiers tend to be sensitive to back-reflected light that might destroy parts of the amplifier or components connected to an input of the amplifier because any back-reflected light will again be amplified, and back-reflected light may increase a bit error rate or otherwise cause degraded performance in optical fiber communications (especially at higher data transmission speeds). Accordingly, an important design objective in an optical system is to reduce back reflection that may cause degraded performance, upstream damage, and/or the like.

SUMMARY

According to some implementations, an optical assembly may include: an input fiber; and an endcap device that includes: an input facet spliced onto the input fiber; an output end through which counterpropagating light enters the endcap device; and a plurality of angled facets arranged at respective angles relative to an axis of the endcap device to reflect at least a portion of the counterpropagating light back through the output end.

According to some implementations, a fiber endcap may include: an input facet spliced onto an input fiber; a cylindrical body portion having an output end through which counterpropagating light enters the fiber endcap; and three angled facets arranged at an angle in a range from 30° to 40° relative to an axis of the cylindrical body portion, and distributed symmetrically in a rotational direction with respect to the axis of the cylindrical body portion, to reflect the counterpropagating light through total internal reflection back through the output end.

According to some implementations, a fiber endcap may include: an input facet spliced onto an input fiber; a body portion having an output end through which counterpropagating light enters the fiber endcap; and a plurality of angled facets that are arranged at an angle relative to an axis of the body portion such that the counterpropagating light is reflected through total internal reflection back through the output end, wherein the fiber endcap has an internal total internal reflection acceptance angle based on the angle at which the plurality of angled facets are arranged relative to the axis of the fiber endcap and a refractive index of a material used to fabricate the fiber endcap at an operating wavelength of the counterpropagating light that enters the fiber endcap.

DETAILED DESCRIPTION

The following detailed description of example implementations refers to the accompanying drawings. The same reference numbers in different drawings may identify the same or similar elements.

In high-power fiber laser application, such as high-power material processing, one or more optical devices may be arranged to enable a high-power fiber laser to provide a relatively high output power (e.g., at least 10 watts (W)) from a single fiber. For example, the high-power fiber laser may include a fiber optic beam combiner that receives multiple optical inputs from multiple laser modules (e.g., via respective input fibers) and combines the multiple optical inputs to form an optical output in a single output fiber. Accordingly, due to the high optical power of a high-power fiber laser, precautions typically need to be taken to reduce the possibility of a catastrophic failure of an optical device included in the high-power fiber laser (e.g., a failure of one or more components of a fiber optic beam combiner). For example, back reflection is a significant concern in a high-power fiber laser application (e.g., cutting, welding, material depositing, and/or the like) because high power back-reflection from a workpiece, downstream optical components, and/or the like can cause significant upstream damage. Accordingly, as operating powers continue to scale upwards, there will be increased issues with managing counterpropagating back-reflected light that enters a fiber termination structure, such as a fiber optic endcap, which generally lack a mechanism to reject back-reflected light. Furthermore, to the extent that there have been efforts to design fiber termination structures that can mitigate back reflection, existing designs suffer from various drawbacks.

Figure 1:
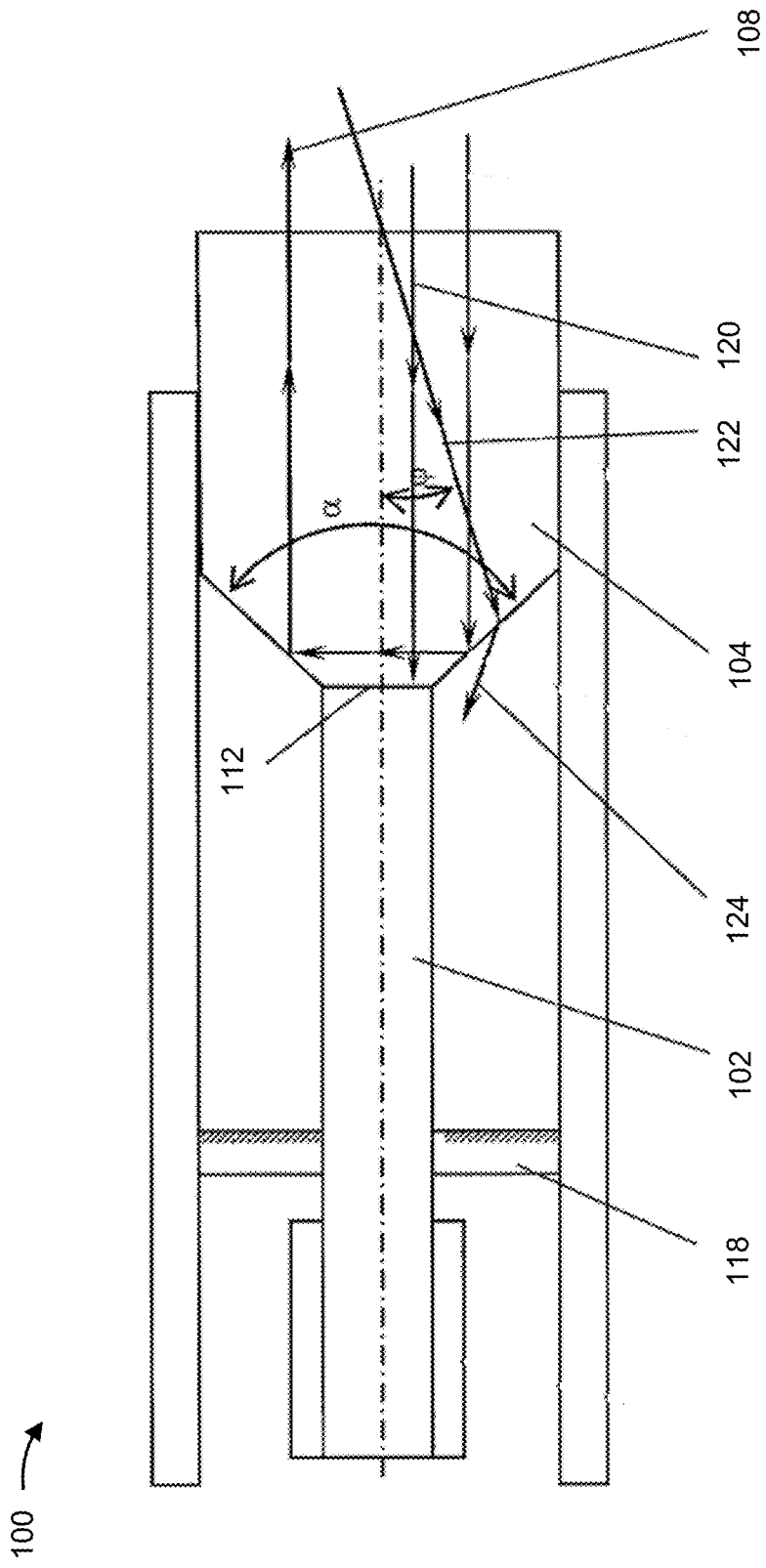
FIG. 1 is a diagram of a fiber output endcap.

For example, FIG. 1 illustrates an example 100 of a fiber output endcap (or termination block) that includes a nominally 45° frustoconical shape, which may cause back reflections from downstream objects to be retroreflected out of the fiber output endcap by total internal reflection (TIR). In the design illustrated in FIG. 1 (as in other typical fiber output endcap designs), an operating laser beam transits an optical fiber 102 from left to right. At an interface 112, the fiber is spliced to cylindrical endcap 104, which includes a frustoconical section with an angle α near 90° (e.g., a 45° cone angle). Here, the laser beam enters the fiber output endcap and is transmitted out a distal end of the fiber output endcap. In operation, there may be a back-reflected laser beam 120 or 122 from downstream optical components, a workpiece being processed by the laser beam, and/or the like.

In general, to improve performance, the back-reflected laser beam 120 or 122 should be reflected back out of the fiber optic endcap (e.g., to the right in FIG. 1) rather than being transmitted backward into the fiber termination structure. For example, in the design shown in FIG. 1, a back-reflected beam 124 is transmitted backward into the fiber termination structure, necessitating the use of a washer 118 to block the back-reflected beam 124 from causing damage upstream. In this design, if the back-reflected beam 124 is well-aligned to an axis of the endcap (e.g., as beam 120 is generally aligned to the axis of the endcap), then the back-reflected beam can be retroreflected by two total internal reflections (TIRs), each near 45° incidence, so that the back-reflected beam exits the fiber optic endcap as beam 108.

The fiber output endcap illustrated in FIG. 1 suffers from a design flaw in typical industrial applications in the range of a 1 micron wavelength. In particular, the fiber optic endcap is made from the same material as the optical fiber (e.g., fused silica) to permit the fiber optic endcap and the fiber optic endcap to be fusion spliced together. However, a TIR acceptance angle range for this configuration is relatively small, as the minimum TIR angle for silica is $\sin^{-1}(1/1.45) \approx 43.6°$ (where the refractive index near 1 micron is about 1.45). Accordingly, given the 45° cone angle, the back-reflected beam 120 needs to be aligned with an axis of the fiber optic endcap within 1.4° in order to guarantee TIR at both bounces. Any back-reflected light at an internal angle greater than 1.4° to the axis of the fiber optic endcap will escape the fiber optic endcap and continue into the fiber termination structure, similar to beam 124, where the back-reflected light needs to be managed (e.g., using a mechanism such as washer 118 to block the back-reflected beam 124) in an area where the back-reflected light may otherwise cause damage. Furthermore, while the geometry of the fiber output endcap design illustrated in FIG. 1 can be varied, the fundamental problem of limited TIR angle range cannot be avoided by any design that uses two reflections.

Some implementations described herein relate to a fiber optic endcap device having multiple planar or near-planar facets arranged to reflect at least a portion of incoming backwards-traveling or counterpropagating light. In some implementations, the fiber optic endcap device may include an input facet spliced onto an input fiber, an output end through which counterpropagating light enters the endcap device, and multiple angled facets that are arranged at respective angles relative to an axis of the endcap device to reflect at least a portion of the counterpropagating light back through the output end. For example, in some implementations, the fiber optic endcap device may include three angled facets that are arranged at an angle in a range from 30° to 40° (e.g., $\sin^{-1}(1/\sqrt{3}) \approx 35.3°$) relative to the axis of the fiber optic endcap device, and distributed symmetrically in a rotational direction with respect to the axis of the cylindrical body portion, to reflect the counterpropagating light back through the output end through TIR. Alternatively, in some implementations, the fiber optic endcap device may include two angled facets or four or more angled facets, in which case the angled facets may have a highly reflective coating and may be arranged at respective angles relative to the axis of the endcap device in a range from 40° to 50° (e.g., 45°). In this way, the fiber optic endcap device may reject back-reflected light over a wide range of incidence angles by reflecting at least a portion of counterpropagating light that enters the endcap device back through the output end (e.g., in the same direction from which the light originated).

Figure 2A:
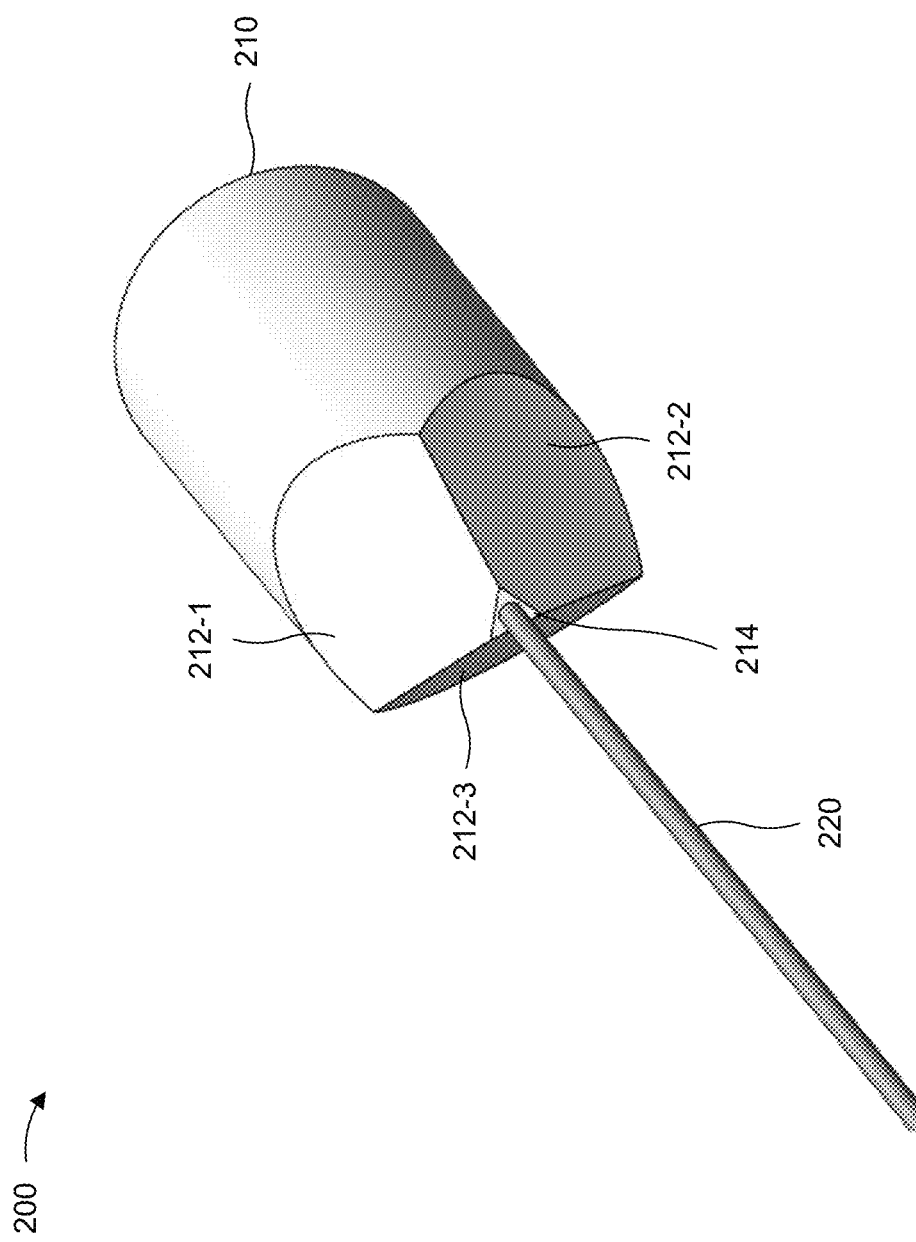
FIGS. 2A-2C are diagrams of one or more example implementations of a fiber optic endcap device having multiple planar or near-planar facets arranged to reflect at least a portion of incoming backwards-traveling or counterpropagating light.
Figure 2B:
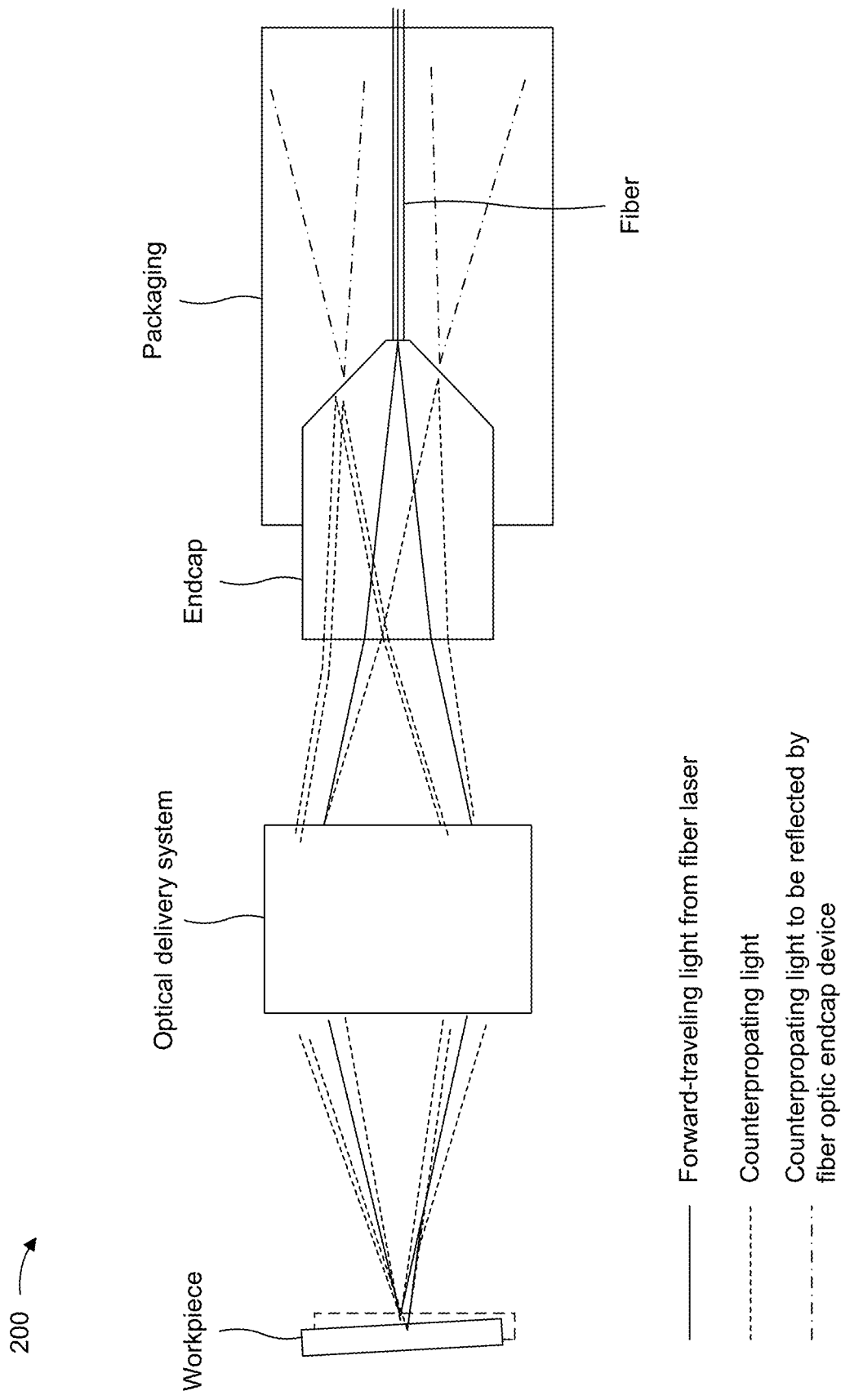
Figure 2C:
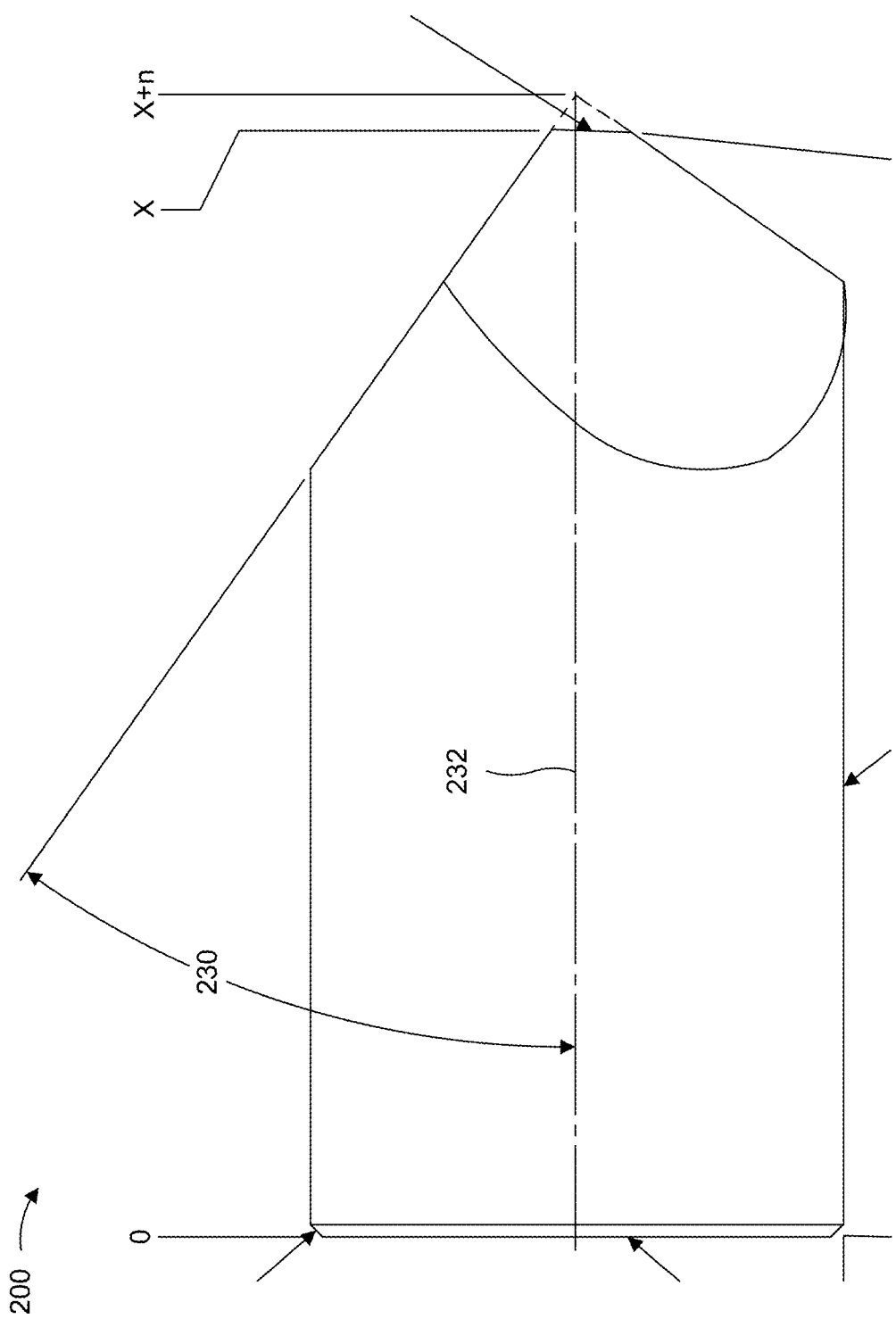

FIGS. 2A-2C are diagrams of one or more example implementations 200 of a fiber optic endcap device having multiple planar or near-planar facets arranged to reflect at least a portion of incoming backwards-traveling or counterpropagating light. In general, FIG. 2A illustrates a perspective view of the fiber optic endcap device in a design with three facets, FIG. 2B illustrates an optical system in which the fiber optic endcap device may be arranged to reflect at least a portion of counterpropagating light that may cause upstream damage, and FIG. 2C illustrates a side view of a three-faceted fiber optic endcap device showing an angle of the facets relative to a cylindrical axis of the three-faceted fiber optic endcap device.

In some implementations, as shown in FIG. 2A, the fiber optic endcap device may include a cylindrical body portion having an output end 210 through which counterpropagating light enters the fiber optic endcap device, multiple angled facets 212-1, 212-2, 212-3 that are arranged at respective angles relative to an axis of the fiber optic endcap device to reflect at least a portion of the counterpropagating light back through the output end 210, and an input facet 214 spliced onto an input fiber 220. In this case, the fiber optic endcap device may have a shape that incorporates a three-faceted retroreflector, which may provide three reflections (one off each facet 212) to retroreflect any back-reflected counterpropagating light that enters the fiber optic endcap device through the output end 210. For example, as described herein, back-reflected or counterpropagating light may generally refer to light that passes forward through the fiber optic endcap device (e.g., from the input fiber 220 through the input facet 215) and is back-reflected by a downstream component, such as a workpiece, that causes forward-traveling light to be reflected, scattered, and/or deflected in multiple directions.

For example, as shown in FIG. 2B, an optical system may include an input fiber arranged to deliver forward-traveling light from a fiber laser into a fiber optic endcap device. The forward-traveling light, shown in FIG. 2B as solid lines, may pass forward through the fiber optic endcap and into an optical delivery system that focuses the forward-traveling light towards a workpiece or another suitable downstream component. If the workpiece were to be arranged as a perfectly aligned mirror surface, the focused light would generally be reflected back along the same path and coupled back into the input fiber. However, as shown in FIG. 2B, in a materials processing application the workpiece is typically not perfectly aligned with the focused light delivered by the optical delivery system. Accordingly, molten material at the workpiece causes back-reflected or counterpropagating light to be reflected, scattered, and deflected in multiple directions, shown in FIG. 2B as dashed lines. As a result, the back-reflected or counterpropagating light may re-enter the fiber optic endcap device through the output end, and because the back-reflected or counterpropagating light is produced by an off-axis reflection rather than an on-axis reflection that would be coupled back into the fiber, at least a portion of the back-reflected or counterpropagating light is not coupled back into the fiber. In cases where the fiber optic endcap device is non-retroreflective, some of the back-reflected or counterpropagating light that is not coupled back into the fiber may transmit through the non-retroreflective fiber optic endcap device, shown in FIG. 2B as dash-dotted lines, and this counterpropagating light may cause damage to packaging surrounding the fiber. Accordingly, in some implementations described herein, the fiber optic endcap device may be designed to be retroreflective or to otherwise reject the back-reflected or counterpropagating light that may cause damage to upstream components (e.g., the fiber packaging).

For example, in some implementations, the fiber optic endcap device may have three angled facets 212-1, 212-2, 213-3 (e.g., as shown in FIG. 2A), and therefore provides three reflections for any counterpropagating light that enters the fiber optic endcap device through the output end 210, to ensure a larger incidence angle at each reflection. In this way, the fiber optic endcap device may have a greater TIR acceptance range relative to a design with two reflections (e.g., the design shown in FIG. 1). Furthermore, as shown in FIG. 2C, an angle 230 at which the facets 212 of the fiber optic endcap device are arranged may be $\sin^{-1}(1/\sqrt{3}) \approx 35.3°$ relative to an axis 232 of the fiber optic endcap device, resulting in an internal angle of incidence of approximately 54.7° for on-axis beams and a margin of approximately 11.1° relative to a minimum TIR angle. Accordingly, in this case, the fiber optic endcap device may retroreflect incoming counterpropagating beams with an internal angle from 0° to 11.1° relative to the axis 232 of the fiber optic endcap device (corresponding to external angles from 0° to 16.3° relative to the axis 232). Furthermore, because the fiber optic endcap device uses TIR to reject counterpropagating light, the fiber optic endcap device is more robust than other options such as using reflective coatings on the back side of the endcap.

In some implementations, a design with three facets 212 that are angled at 35°±5° relative to the axis 232 of the fiber optic endcap device may enable TIR with generous margins. Additionally, or alternatively, the fiber optic endcap device may have at least one planar (or near-planar) reflective facet (e.g., via TIR or a reflective coating). Alternatively, in some implementations, the fiber optic endcap device may have two facets 212, or four or more facets 212, in which case performance may be improved by arranging the facets 212 such that the respective angles 230 at which the facets 212 are arranged is in a range from 40° to 50° (e.g., near 45°). Furthermore, in cases where the fiber endcap device has two facets 212, four facets 212, or more than four facets 212, a high-reflective coating may be added to the facets 212. Furthermore, in some implementations, the facets 212 may be spaced substantially evenly in a rotational (azimuthal) direction (e.g., by 120° in a design with three angled facets 212).

In some implementations, in cases where the fiber optic endcap device has three angled facets 212, the angle of $\sin^{-1}(1/\sqrt{3}) \approx 35.3°$ relative to the axis 232 is generally based on geometric properties, as this angle results in the three facets 212 being mutually orthogonal, as in a classical corner-cube retroreflector. For example, when the three facets 212 are arranged at the angle of $\sin^{-1}(1/\sqrt{3}) \approx 35.3°$ such that the three facets 212 are mutually orthogonal, the three facets may be arranged in a manner similar to the internal corner of a cube, which causes the counterpropagating light to be reflected back in a direction from which the light originated with minimal scattering. Furthermore, in some implementations, the fiber optic endcap device may have a refractive index based on characteristics of the 1 micron wavelength. For example, in some implementations, the fiber optic endcap device may have a refractive index of $n \approx 1.45$ and a TIR cutoff angle of $\sin^{-1}(1/n) \approx 43.6°$, whereby TIR can only occur for angles of incidence greater than 43.6" onto the face. The internal TIR acceptance angle of 11.1° is given by a difference between 54.7° (the complement of the 35.3° angle at which the facets 212 are arranged) and the 43.6° TIR cutoff angle, which determines (by refraction) the external acceptance angle of 16.3°. In this way, the fiber optic endcap device has a relatively large external acceptance angle compared to the range of external acceptance angles that could be expected to be imaged backward from the workpiece through delivery optics (e.g., 5-10°).

In some implementations, the shapes of the facets 212 and the angle(s) 230 at which the facets 212 are arranged relative to the axis 232 may be used for different wavelengths of light, such as a 1.31 micron wavelength, a 1.55 micron wavelength, and/or the like. For example, different wavelengths of light may result in only slight changes to the refractive index and therefore the TIR cutoff angle and the acceptance angle. Furthermore, the angle(s) 230 at which the facets 212 are arranged relative to the axis 232 may be independent from the input fiber 220, except that the input facet 214 on a tip of the fiber optic endcap device (shown as a small transverse triangular facet in FIG. 2A) is generally large enough to permit the input fiber 220 to be spliced onto the tip of the fiber optic endcap device. The core of the input fiber 220, and the light emitted from the core of the input fiber 220, can be single mode or multimode. Furthermore, the shapes of the facets 212 may be independent from the diameter of the cylindrical body portion of the fiber optic endcap device, which may be in a range from 2-20 mm. In some implementations, angling the facets at 35.3° relative to the axis 232 of the fiber optic endcap device ensures that light is retroreflected in the same direction from which the light originated (e.g., towards the output end 210). Additionally, or alternatively, in some implementations, the respective angles at which the facets 212 are arranged may be anywhere in a range from 30° to 40°. Furthermore, in some implementations, the facets 212 may be arranged at different respective angles (e.g., to disperse the reflected light and avoid hot spots). Accordingly, as described herein, the fiber optic endcap device may have any suitable configuration in which multiple planar or near-planar facets can reflect at least a portion of counterpropagating light that enters the fiber optic endcap device through the output end 210.

In some implementations, the fiber optic endcap device can be fabricated using optical fabrication processes such as grinding and polishing. In some implementations, the input facet 214 may be provided at a normal incidence relative to the axis 232 of the fiber optic endcap device, and the input fiber 220 may be spliced to the input facet 214. In some implementations, the input facet 214 may be triangular, as shown in FIG. 2A, and may have dimensions that are large enough relative to the input fiber 220 to enable a satisfactory splice, which may be performed using an electric arc, an electric filament, a $CO_2$ laser, an oven, a flame, a short-pulse laser, a chemically-activated bond, a diffusion bond, and/or any other suitable joining technique. In some implementations, the fiber optic endcap device may be made from a material that is the same as or different from the input fiber 220, depending upon any constraints of the technology used to join the input fiber 220 to the input facet 214. For example, in some implementations, the fiber optic endcap device may be made from a crystalline material, which may provide improved thermal conduction and an improved damage threshold relative to a fused-silica endcap. In some implementations, the material from which the fiber optic endcap device is formed may have a very low absorption (e.g., less than 100 ppm/cm) at an operating wavelength to avoid heating and damage. In some implementations, an antireflective coating may be provided on the output end 210 of the fiber optic endcap device, and the antireflective coating may have a very low absorption (e.g., less than 100 ppm) and a high damage threshold (greater than 1 kW/cm²). In some implementations, the angled facets 212 may be polished, clean, sealed to the outside environment, and (in the region where back reflection may be expected) not in contact with cooling water, glue, heatsinking compound, or other material other than air or other gas, to ensure good TIR performance. Alternatively, if the facets 212 are to be in contact with another material (e.g., cooling water), a reflective coating may be applied to the facets 212.

Accordingly, as shown in FIGS. 2A-2C and described herein, the fiber optic endcap device may generally include an input facet 214 spliced onto an input fiber 220, an output end 210 through which counterpropagating light enters the fiber optic endcap device, and multiple angled facets 212 that are arranged at respective angles 230 relative to an axis 232 of the fiber optic endcap device to reflect at least a portion of the counterpropagating light back through the output end 210. For example, in some implementations, the fiber optic endcap device may include three angled facets 212, and the respective angles 230 at which each of the angled facets 212 are arranged relative to the axis 232 of the fiber optic endcap device may be in a range from 30° to 40° (e.g., $\sin^{-1}(1/\sqrt{3}) \approx 35.3°$ such that the three angled facets 212 are mutually orthogonal). Alternatively, in some implementations, the fiber optic endcap device may include two angled facets 212, four angled facets 212, or more than four angled facets 212, in which case the respective angles 230 at which each of the angled facets 212 are arranged relative to the axis 232 of the fiber optic endcap device may be in a range from 40° to 50°. Furthermore, in such cases, at least one of the angled facets 212 may have a reflective coating. In either case, the angled facets 212 may be distributed symmetrically in a rotational (e.g., azimuthal) direction with respect to the axis 232 of the fiber optic endcap device.

Furthermore, as described herein, the angled facets 212 of the fiber optic endcap device may include at least one substantially planar reflective face adapted to reflect at least the portion of the counterpropagating light through TIR, a reflective coating, and/or the like. In general, the fiber optic endcap device may have an internal TIR acceptance angle that is based on the respective angles 230 at which the angled facets 212 are arranged relative to the axis 232 of the fiber optic endcap device and a refractive index of a material used to fabricate the fiber optic endcap device at an operating wavelength of the counterpropagating light, and the material used to fabricate the fiber optic endcap device may have a relatively low absorption that satisfies a threshold at the operating wavelength. Furthermore, an external acceptance angle for the portion of the counterpropagating light reflected by the angled facets 212 may depend on the internal TIR acceptance angle. Moreover, in some implementations, the output end 210 of the fiber optic endcap device may include an antireflective coating that satisfies an absorption threshold and a damage threshold. In some implementations, the angled facets 212 may be arranged to not be in contact with any material other than air or gas in a region where the portion of the counterpropagating light is reflected. Alternatively, in some implementations, one or more of the angled facets 212 may have a reflective coating to enable contact with a material other than air or gas in a region where the portion of the counterpropagating light is reflected.

As indicated above, FIGS. 2A-2C are provided merely as one or more examples. Other examples may differ from what is described with regard to FIGS. 2A-2C. For example, the number and arrangement of components shown in FIGS. 2A-2C are provided as an example. In practice, the arrangements shown in FIGS. 2A-2C may include additional components, fewer components, different components, or differently arranged components than those shown in FIGS. 2A-2C. Additionally, or alternatively, a set of components (e.g., one or more components) in FIGS. 2A-2C may perform one or more functions described as being performed by another set of components in FIGS. 2A-2C.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical assembly, comprising:
   an input fiber; and
   an endcap device that comprises:
   an input facet spliced onto the input fiber;
   an output end through which counterpropagating light enters the endcap device; and
   at least three angled facets arranged at respective angles relative to an axis of the endcap device to cause at least three reflections of a portion of the counterpropagating light before the portion of the counterpropagating light is output back through the output end.

2. The optical assembly of claim 1, wherein each of the respective angles is in a range from 30° to 40° relative to the axis of the endcap device.

3. The optical assembly of claim 1, wherein the at least three angled facets comprise at lease one substantially planar reflective face adapted to reflect at least the portion of the counterpropagating light through one or more of total internal reflection or a reflective coating.

4. The optical assembly of claim 1, wherein each of the respective angles is in a range from 40° to 50° relative to the axis of the endcap device.

5. The optical assembly of claim 4, wherein at least one of the at least three angled facets has a reflective coating.

6. The optical assembly of claim 1, wherein the endcap device has an internal total internal reflection acceptance angle that is based on the respective angles and a refractive index of a material used to fabricate the endcap device at an operating wavelength of the counterpropagating light.

7. The optical assembly of claim 6, wherein an external acceptance angle for the portion of the counterpropagating light reflected by the at least three angled facets is based on the internal total internal reflection acceptance angle.

8. The optical assembly of claim 6, wherein the material used to fabricate the endcap device has a low absorption that satisfies a threshold at the operating wavelength.

9. The optical assembly of claim 1, wherein the at least three angled facets are distributed symmetrically in a rotational direction with respect to the axis of the endcap device.

10. The optical assembly of claim 1, wherein the output end of the endcap device comprises an antireflective coating that satisfies an absorption threshold and a damage threshold.

11. The optical assembly of claim 1, wherein the at least three angled facets are not in contact with any material other than air or gas in a region where the portion of the counterpropagating light is reflected.

12. The optical assembly of claim 1, wherein at least one of the at least three angled facets comprises a reflective coating to enable contact with a material other than air or gas in a region where the portion of the counterpropagating light is reflected.

13. A fiber endcap, comprising:
an input facet spliced onto an input fiber;
a cylindrical body portion having an output end through which counterpropagating light enters the fiber endcap; and
three angled facets arranged at an angle in a range from 30° to 40° relative to an axis of the cylindrical body portion, and distributed symmetrically in a rotational direction with respect to the axis of the cylindrical body portion, to cause at least three reflections of the counterpropagating light before the counterpropagating light is output through the output end.

14. The fiber endcap of claim 13, wherein the angle is $\sin^{-1}(1/\sqrt{3}) \approx 35.3°$ such that the three angled facets are mutually orthogonal.

15. The fiber endcap of claim 13, wherein an internal total internal reflection acceptance angle of the fiber endcap is based on the angle and a refractive index of a material used to fabricate the fiber endcap at an operating wavelength of the counterpropagating light.

16. The fiber endcap of claim 13, wherein the cylindrical body portion has a diameter in a range from 2 millimeters to 20 millimeters.

17. A fiber endcap, comprising:
an input facet spliced onto an input fiber;
a body portion having an output end through which counterpropagating light enters the fiber endcap; and
at least three angled facets that are arranged at an angle relative to an axis of the body portion such that the counterpropagating light is reflected at least three times before the counterpropagating light is output through the output end,
wherein the fiber endcap has an internal total internal reflection acceptance angle based on the angle and a refractive index of a material used to fabricate the fiber endcap at an operating wavelength of the counterpropagating light that enters the fiber endcap.

18. The fiber endcap of claim 17, wherein an external acceptance angle for the counterpropagating light reflected by the at least three angled facets is based on the internal total internal reflection acceptance angle.

19. The fiber endcap of claim 17, wherein the at least three angled facets are distributed symmetrically in a rotational direction with respect to the axis of the body portion.

20. The fiber endcap of claim 17, wherein the material used to fabricate the fiber endcap has a low absorption that satisfies a threshold at the operating wavelength.

* * * * *